(12) United States Patent
Ma et al.

(10) Patent No.: US 7,680,075 B2
(45) Date of Patent: Mar. 16, 2010

(54) IDENTIFICATION OF BASE STATIONS

(75) Inventors: Zhengxiang Ma, Summit, NJ (US); Paul Anthony Polakos, Marlboro, NJ (US)

(73) Assignee: Alcatel-Lucent USA Inc., Murray Hill, NJ (US)

( * ) Notice: Subject to any disclaimer, the term of this patent is extended or adjusted under 35 U.S.C. 154(b) by 904 days.

(21) Appl. No.: 11/435,664

(22) Filed: May 17, 2006

(65) Prior Publication Data

US 2007/0268853 A1    Nov. 22, 2007

(51) Int. Cl.
*H04W 4/00* (2009.01)
(52) U.S. Cl. ............... 370/328; 370/335; 370/152; 370/321; 370/350; 370/342
(58) Field of Classification Search ............ 370/328, 370/350, 342, 335, 152, 321
See application file for complete search history.

(56) References Cited

U.S. PATENT DOCUMENTS 6,208,632 B1 * 3/2001 Kowalski et al. .......... 370/335
6,519,237 B1 * 2/2003 McDonough et al. ...... 370/335
6,760,366 B1 * 7/2004 Wheatley et al. ........... 375/152
2003/0026242 A1 * 2/2003 Jokinen et al. ............. 370/350
2003/0179737 A1 * 9/2003 Dor et al. ................... 370/342
2004/0196800 A1 * 10/2004 Padovani et al. ........... 370/321

FOREIGN PATENT DOCUMENTS

WO    WO 99/37040    7/1999
WO    WO 00/24136    4/2000
WO    WO 01/76088    10/2001

OTHER PUBLICATIONS

"UMTS Terrestrial Radio Access Concept Evaluation", ETSI Technical Report, Dec. 1997, pp. 47-48.

* cited by examiner

*Primary Examiner*—David Q Nguyen
(74) *Attorney, Agent, or Firm*—Harness, Dickey & Pierce

(57) ABSTRACT

The identification of wireless communication base stations in a region of high base station density is effected using a specific identification signal pattern transmitted by the base stations. In particular, each base station transmits a signal having a pattern with at least two time phase shifts relative to at least one time benchmark. The combination of these phase shifts allows identification of the transmitting base station. Since a plurality of phase shifts leads to a concomitantly larger number of phase shift combinations, the capacity to identify base stations is enlarged.

12 Claims, 1 Drawing Sheet

IDENTIFICATION OF BASE STATIONS

CROSS-REFERENCE TO RELATED APPLICATION

This application is related to U.S. patent application Ser. No. 11/435,665 (De Lind Van Wijngaarden 15-19-15-21-5-3-64-10) filed May 17, 2006 (concurrently herewith) and is hereby incorporated by reference in its entirety.

TECHNICAL FIELD

This invention relates to wireless communication systems and in particular wireless communication systems that require identification of base stations.

BACKGROUND OF THE INVENTION

A wireless network generally is divided into a multiplicity of cells with each cell having at least one base station. A user within the cell wishing to send information establishes communication with a base station in the cell. This receiving base station communicates typically with a mobile switching center (MSC), another base station, or another network entity that, in turn, relays the information through the network to the central office or base station in the cell where the intended recipient is located.

A variety of protocols has been developed to achieve such goal. A prime requirement of any network is the ability of a mobile to identify a base station whose signal it is receiving. Several techniques have been developed to effect such identification. These techniques generally involve the transmission of a patterned signal over a channel not used for primary communication but instead used for network administrative purposes such as base station identification. (This administrative channel is generally denominated the pilot channel and the signal it transmits a pilot signal.) For example, in CDMA2000 systems a pseudo random noise (PN) pattern is used for base station identification purposes. This pattern is repeated in 26-⅔ millisecond intervals of $2^{15}$ chips each with each chip constituting a timing period of about 0.813 microseconds. An interval of $2^{15}$ chips is divided, in turn, into 512 valid PN offsets that are separated by 64 chips between each offset position. Thus a base station identifies itself by transmitting on the pilot channel with the beginning of the pseudo random noise pattern coinciding with the assigned PN offset of the base station. A user wishing to initiate communication searches for the strongest pilot signal on a particular carrier frequency and demodulates the overhead channels associated with the strongest pilot signal. The information broadcasted on this overhead channel allows identification by PN offset of a base station for communication. Once a user establishes communication with a base station, it continues to search for the pilot signals of neighboring base stations in preparation for handoff if the link with the current serving base station weakens.

The received pilot signal from neighboring base stations is not necessarily detected at the beginning of any 64 chip interval. Often, transit time for the signal to traverse the distance between the transmitter and the receiver causes a time delay, i.e., a phase shift, so that the signal is detected at a time other than the beginning of a 64 chip interval. Additionally, signals often are reflected from natural structures such as mountains and man made structures such as buildings. Such reflection before reception increases the transmission path and accordingly increases the phase shift. In practice, phase shifts are accommodated by employing a search window. The time region around the beginning of a 64 chip interval is searched for the beginning of a PN pattern. Generally, this time interval is +/−10 chips. If a signal is detected within the window, the PN offset associated with the center of the window is assigned. A larger window is sometimes employed for regions producing frequent larger phase shifts due to reflections from relatively distant objects. Nevertheless, observation of a pattern start within the window is associated with a PN offset corresponding to the window center.

Similarly, for other systems such as universal mobile telecommunication systems (UMTS), identification is accomplished by using PN code. In a WCDMA/UMTS system, the base stations are not constrained to be synchronous, for example, by using a GPS signal. To identify different base stations, each base station uses one of 512 Gold code sequences as a unique pseudo-random scrambling sequence. Each UTMS base station radiates an unmodulated scrambling sequence as a common pilot channel. To aid in efficient base station identification, the base station also radiates a primary and a secondary search channel). The former is a fixed repeated short sequence for all base stations at the beginning of a transmission slot. The latter is also a fixed short sequence (having 64 possible modulations) repeated every frame or every 15 slots. The combination facilitates identification of base station signal framing and significantly limits the number of scrambling codes to be searched A user during the identification process accesses a table (generally denominated a neighbor list) that specifies a relatively small number of PN codes or other identification indicia for the base stations in the user's geographic area. To limit the size of this neighbor list and to enhance its efficacious use, the list is typically limited to a maximum of 20 to 30 base stations. Thus a user detecting a base station signal need not search all possible PN offsets for base stations in the network but merely compares the detected pilot signal to PN offsets on the neighbor list.

Often in urban areas many buildings have their own base station and associated identification. However if there are more than about 30 buildings in a limited geographic area, the neighbor list becomes sufficiently large to impact efficient identification. Additionally, if there are significantly more base stations such as associated with a region having very dense indoor mobile cells, the number of PN offsets themselves could be exhausted. In either case, significant inherent problems result.

Difficulties emerge not only where there is a high density of buildings having base stations but also in areas with a dense concentration of small cells, e.g., mini or pico-cells. (The term compact cell will be used to comprehend cells, e.g. in building, mini-, or pico-cells, having a limited geographic area, i.e., an area less than 30,000 meters squared.) Such compact cells are employed for purposes such as relieving traffic hot spots. With increasing use of indoor cells, mini-cells, and/or pico-cells, the associated identification difficulties also substantially increase.

It is therefore desirable to establish an approach for increasing the available identifying parameters such as PN offsets in a wireless system. It is particularly advantageous for such approach to avoid the addition of hardware and instead to employ a software modification to existing equipment.

SUMMARY OF THE INVENTION

It has been found that in compact cells use of more than one timing marker, e.g. PN offset, to identify a base station substantially increases the distinct identification codes available without the need for the design of new equipment. For example, in the case of CDMA a base station in a compact cell transmits on a pilot channel using two PN offsets and with an associated phase shift with each such offset. Thus as shown in FIG. 1 the base station in a compact cell begins its pseudo random noise pattern at, for example, time, 3, and time, 4. Time 3 has a phase shift 6 associated with PN offset 7 and time 4 has a phase shift 8 associated with PN offset 9. The presence of two specific phase shifts and/or the difference, 1, between phases 3 and 4 and/or the difference between phase shift, 6, and phase shift 8 is indicative of the base station identification. Another base station, to continue the example, identifies itself by using phase shift 23 associated with PN offset 7 and phase shift 24 associated with PN offset 9. In one embodiment, the time spread 21 between phase 23 and phase 24 identifies this second base station. The two base stations corresponding to time block 1 and time block 21 are differentiated by their block time duration. Thus, since block 21 has a time duration different (greater) than block 1, the two connote different base station identifications.

The scheme can be expanded by picking more than two interval identifications, e.g. PN offsets, and using combinations or permutations of phase shifts among the intervals to expand the possible identification codes. Additionally, the beginning of each pattern interval, e.g., phase shift for a particular PN offset, is transmissible with an associated intensity. Such intensity is also useful in differentiating identification codes. The use of more than one PN offsets in a primary carrier, i.e., a carrier with active data or voice traffic, creates interference to the carrier. Thus it is preferred to employ the multiple PN offsets for radiating beacons, (i.e., carriers not carrying active data or voice traffic), but instead, contain only pilot signals for facilitating hard handoff.

The difficulties associated with signal reflections and transmission time delays do not change the relative time or strength relationships between the multiple PN offsets. Therefore, existing equipment is capable of resolving the time differences associated with base station identification in the practice of the invention. Thus, existing equipment without the addition of expensive modifications is employable. As a result, it is possible to accommodate the proliferation of compact cells with existing equipment.

DETAILED DESCRIPTION

Figure 1:
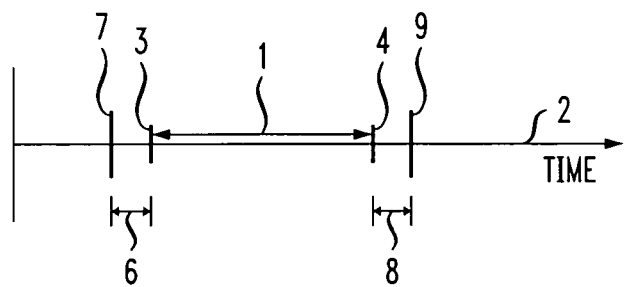
FIGS. 1 and 2 illustrate time sequences involved in base station identification.

The identification of base stations in compact cells is accomplished using phase shifts relative to at least one benchmark, preferably at least two benchmarks, of a beacon signal. (The terms phase shift and phase are used interchangeably in the remainder of this disclosure.) For purposes of this invention, a benchmark is a point in time that is specifically identifiable from a repeated transmission pattern. Thus in the example of a CDMA system, exemplary benchmarks are the times at which each PN offset begins. For a UTMS system, exemplary benchmarks are also the beginnings of each data frame. The phase associated with each benchmark is the point in time relative to each benchmark that the pattern of the beacon signal actually begins. To illustrate, in a CDMA system the beginning of a two second time interval is marked by a global positioning satellite (GPS) signal. As previously discussed, such two second interval is divided into seventy-five 26-⅔ millisecond divisions. Each division in turn is divided into 512 PN offsets having a benchmark time relative to the GPS signal marking the beginning of a two-second interval. Thus, to illustrate further, the $33^{rd}$ PN offset is a benchmark. If the beacon signal begins its pseudo random noise pattern eight chips, (6 in FIG. 1), after the $33^{rd}$ PN offset, 7, the time point of the phase shift of this signal is the point, 3, on the time line, 2. Similarly, in a subsequent time division if the pattern of the beacon signal is made to begin four chips, (8 in FIG. 1), before the $34^{th}$ PN offset, 9, the phase shift is indicated by the time, 4.

Figure 2:
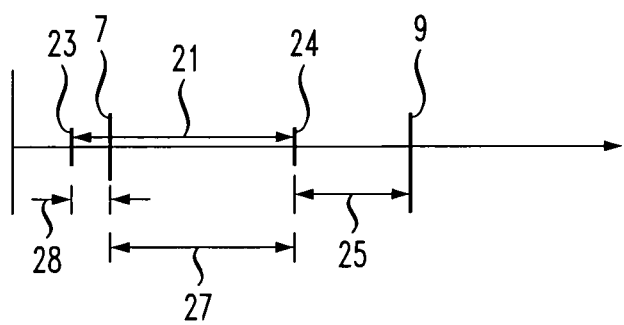

By adjusting the pattern of the beacon signal to yield at least two phases relative to benchmark(s) the number of identification possibilities for the network is substantially increased. In particular, in the example of FIG. 1, base station identification is associated with the time difference, 1, between the two phases 3 and 4 as well as with the two specific phases 3 and 4. Identification of the base station is done by assigning the base station to a phase time difference (the time interval difference, 1) and/or a combination of phases (the detection of both phases 3 and 4) and/or the difference between the signed size of the phase shifts (e.g. the difference between 6 and 8 in FIG. 1). Similarly, for the same two benchmarks, 7 and 9 shown in FIG. 2, an identification of the base station is made relative to time period 21 that is the difference between phases 23 and 24 and/or relative to the detection of both phases 23 and 24 and/or relative to 28 minus 25 or 28 minus 27.

In a mobile environment, reflections and other time delays tend to obviate the meaning of the absolute value of the phases. However, since the multiple PN offsets contained in a beacon are radiated from a single antenna, and experience the same propagation environment, the time and strength relationships between the multiple offsets are preserved. Mobile equipment presently has the capability of resolving the start of a beacon signal pattern to within ⅛ of a chip. Accordingly present day equipment in a compact cell is easily capable of detecting and accurately determining phase shifts. Since the resolution of such time is within about an eight of a chip, an extremely large number of base station identification marks is possible with the use of even two phase shifts. However, it is generally advantageous, although not essential, to limit phase shifts to one chip intervals to maintain high reliability for the identification system.

Figure 3:
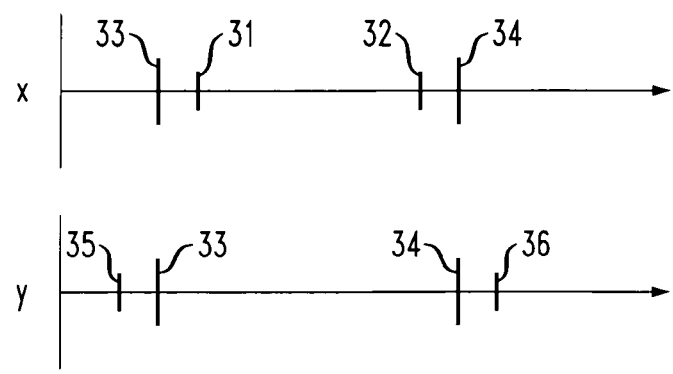
FIG. 3 illustrates possible enhancements associated with certain embodiments.

There is some possibility that two adjacent compact cells (such as the cells in two adjoining buildings) will interfere. For example, as shown in FIG. 3, base station X has identification phases 31 and 32 associated respectively with benchmarks 33 and 34. Base station Y in an adjoining building has identification phases 35 and 36 associated with benchmarks 33 and 34. A user in the vicinity of both buildings could, in specific situations, detect all the phases, 31, 32, 35, and 36. Present equipment is configured so that the first phase shift associated with the benchmark irrespective of signal strength is detected while a second such phase shift is ignored. Thus in the illustration of FIG. 3, phase 35 rather than phase 31 would be associated with benchmark 33 while phase 32 would be associated with benchmark 34. The user would thus misidentify the base station as a base station having phases 35 and 32—a phase combination not present for either base station X or base station Y. To avoid such misidentifications in situations where adjoining compact cells have relatively high signal strengths, the two cells should not have phases associated with precisely the same benchmarks. Thus in the example of FIG. 3 if base station Y used phases relative to benchmarks different from 33 and 34, the possibility of misidentification would be substantially reduced.

The number of identification codes available for base stations is even further increased by using more than two phases. Thus, in one embodiment, three phases are employed, each associated with a different benchmark. The number of combinations and permutations associated with three such phases relative to the number available for two phases allows a substantial increase in the identification codes for base stations. The relative strength of the pilot signals associated with the different benchmarks is also employable as a base station identification characteristic. Thus a base station is identifiable using not only phase time points but also the signal strength associated with these time points. A base station is identified by the complete combination of phases and their associated signal strengths. Accordingly, the number of base stations that are identifiable is increased. Typically the signal strengths of different phases should differ by at least 3 dB to allow expedient differentiation between such strengths.

As previously discussed, presently employed equipment has a search window around each benchmark. Thus phases present outside the search window are typically not detected. As a result the number of possible identification combinations is limited. Such restriction is eased by expanding the search window. However, the larger the search window the longer it takes to identify phases and to assign such identification with a base station. Typical search windows are −10 chips to +10 chips. Although larger search windows are not precluded, they should be employed in systems in which an extended time for base station identification is acceptable.

If the beacon signal is transmitted with a different carrier frequency from the primary signal, i.e. the signal carrying subscriber information, interference between the beacon and the primary channel is generally avoided. However, if the two are transmitted with the same carrier frequency, greater interference is possible. Such interference is reduced by transmitting on the pilot channel only a fraction of the time or by dynamically controlling for transmission power. This expedient of discontinuous or dynamically controlled pilot transmission is particularly useful for outdoor compact cells deployed using a carrier frequency different from a surrounding cell. When a mobile communicating with a surrounding (macro) cell comes into the coverage area of one of the compact cells, it is able to sense the pilot beacon signal radiated by the compact cell, identify the compact cell, and initiate a hard handoff to the compact cell. Once communications with such cell is established, a user employing the neighbor list knows the possible base stations in its vicinity. As the user approaches another base station identification is facilitated by the use of this neighbor list in a conventional manner. Additionally, the base station identification approach of the invention is useful with other expedients for compact cells. As described in co-pending coassigned U.S. patent application Ser. No. 11/435,665 filed May 17, 2006 (De Lind Van Wijngaarden 15-19-15-21-5-3-64-10; which is hereby incorporated in its entirety by reference) use of a different carrier frequency for the pilot and primary channel with a specifically chosen PN offset for handoff is advantageous.

The invention claimed is:

1. A process for wireless communication including a communication link between user and a base station of a compact cell, said process comprising:
   identification of said base station by said user based on a transmission by said base station of an identification signal pattern, the identification signal pattern being characterized by at least two different time phase shifts relative to at least one benchmark time such that the combination of said different phase shifts is employed to make said identification; and
   establishment of said communication link.

2. The process of claim 1 wherein said identification signal comprises a pseudo-random noise pattern.

3. The process of claim 1 wherein said identification signal comprises a scrambling code.

4. The process of claim 1 wherein said base station transmits said identification signal characterized by three different phase shifts relative to said benchmark time.

5. The process of claim 1 wherein said base station transmits said identification signal characterized by two different phase shifts relative to said benchmark time.

6. The process of claim 1 wherein said signal is further characterized by a signal intensity associated with said phase shift.

7. The process of claim 1 wherein the difference in time between said phase shifts constitutes said identification.

8. The process of claim 1 wherein the presence of said phase shifts constitutes said identification.

9. The process of claim 1 wherein said user searches for said phase shifts within the range of −10 to 10 chips of at least one of said benchmarks.

10. The process of claim 1 wherein said transmission of said identification signal is discontinuous.

11. The process of claim 1 wherein said transmission of said identification signal occurs using a different carrier frequency from the carrier frequency used for said establishment of a communication link.

12. The process of claim 1 wherein the power of said transmission of said identification signal is dynamically controlled.

* * * * *